US010780888B2

(12) United States Patent
Hunt et al.

(10) Patent No.: US 10,780,888 B2
(45) Date of Patent: Sep. 22, 2020

(54) SYSTEMS AND METHODS FOR OPERATING AN AUTONOMOUS VEHICLE IN A GUARDIAN MODE

(71) Applicant: Rivian IP Holdings, LLC, Plymouth, MI (US)

(72) Inventors: Patrick Hunt, Evanston, IL (US); Justin Wade, San Jose, CA (US); Lacey Trelfa, Ypsilanti, MI (US)

(73) Assignee: Rivian IP Holidings, LLC, Plymouth, MI (US)

( * ) Notice: Subject to any disclaimer, the term of this patent is extended or adjusted under 35 U.S.C. 154(b) by 177 days.

(21) Appl. No.: 16/006,536

(22) Filed: Jun. 12, 2018

(65) Prior Publication Data

US 2019/0375409 A1    Dec. 12, 2019

(51) Int. Cl.
| | | |
|---|---|---|
| *B60W 30/182* | (2020.01) | |
| *B60W 50/00* | (2006.01) | |
| *B60W 50/08* | (2020.01) | |
| *B60W 50/12* | (2012.01) | |
| *G01C 21/36* | (2006.01) | |
| *G05D 1/02* | (2020.01) | |

(Continued)

(52) U.S. Cl.
CPC ...... *B60W 30/182* (2013.01); *B60W 50/0098* (2013.01); *B60W 50/085* (2013.01); *B60W 50/12* (2013.01); *G01C 21/36* (2013.01); *G05D 1/0212* (2013.01); *H04L 63/083* (2013.01); *B60W 2540/043* (2020.02); *B60W 2540/215* (2020.02); *H04L 67/12* (2013.01)

(58) Field of Classification Search
CPC ........... B60W 30/182; B60W 50/0098; B60W 50/085; B60W 50/12; G01C 21/36; G05D 1/0212; H04L 63/083

USPC ............................................................. 701/2
See application file for complete search history.

(56) References Cited

U.S. PATENT DOCUMENTS 9,971,348 B1 *   5/2018   Canavor ............ G01C 21/3617
2017/0316254 A1 * 11/2017   Hariri ................. G06K 9/00255
(Continued)

FOREIGN PATENT DOCUMENTS

| DE | 102015003348 | 9/2016 |
| EP | 3121084 | 1/2017 |
| WO | WO 2018044285 | 3/2018 |

OTHER PUBLICATIONS

International Search Report and Written Opinion of PCT/US2019/036453 dated Sep. 18, 2019.

*Primary Examiner* — Yazan A Soofi
(74) *Attorney, Agent, or Firm* — Haley Guiliano LLP

(57) ABSTRACT

Systems and methods are provided herein for operating an autonomous vehicle. A destination is received from a user. A mode selection input is also received from a user. A selected route is determined based on the destination input. In response to determining that the mode selection input identifies a regular driving mode, the autonomous vehicle is operated to travel along the selected route in the regular driving mode. In the regular driving mode at least one capability of a first plurality of capabilities of the autonomous vehicle is enabled. Further, in response to determining that the selection of the mode identifies a guardian mode, the autonomous vehicle is operated to travel along the selected route in the guardian mode. In the guardian mode at least one capability of a first plurality of capabilities of the autonomous vehicle is disabled.

19 Claims, 7 Drawing Sheets

(51) Int. Cl.
*H01L 29/06* (2006.01)
*H04L 29/06* (2006.01)
*H04L 29/08* (2006.01)

(56) References Cited

U.S. PATENT DOCUMENTS

| | | | | |
|---|---|---|---|---|
| 2018/0052000 | A1* | 2/2018 | Larner | G05D 1/0212 |
| 2018/0059663 | A1* | 3/2018 | Yako | B60W 50/12 |
| 2018/0080263 | A1* | 3/2018 | Rose | E05B 81/18 |
| 2018/0088577 | A1* | 3/2018 | Kim | G05D 1/0061 |
| 2018/0108254 | A1* | 4/2018 | Camacho | B60W 30/143 |
| 2018/0329415 | A1* | 11/2018 | Aoi | B60W 50/14 |
| 2018/0341888 | A1* | 11/2018 | Kislovskiy | G06Q 10/0635 |
| 2018/0356821 | A1* | 12/2018 | Kentley-Klay | G01S 17/87 |
| 2018/0361972 | A1* | 12/2018 | Zagorski | B60R 21/015 |
| 2019/0011918 | A1* | 1/2019 | Son | G01C 21/3691 |
| 2019/0193724 | A1* | 6/2019 | Kim | G06K 9/00812 |
| 2019/0248379 | A1* | 8/2019 | Peterson | B60W 50/14 |

\* cited by examiner though the user is not fully competent (e.g., a child user, a senior citizen user, or a mentally challenged user) without a fully competent user being present. However, in such a situation, a user who is not fully competent may misuse the capabilities of the autonomous vehicle while in transit. Such misuse may lead to undesirable situations (e.g., a child requesting to go to a wrong location), or even dangerous situations (e.g., a child opening a door while the car is still in motion, or a child unbuckling a seat belt). Consequently, what is needed is an autonomous vehicle with a mode of operation that is appropriate for transporting users who are not fully competent.

US 10,780,888 B2

SYSTEMS AND METHODS FOR OPERATING AN AUTONOMOUS VEHICLE IN A GUARDIAN MODE

BACKGROUND

Modern autonomous vehicle technology allows an autonomous vehicle to transport passengers between destinations without being directly controlled by a human driver. Consequently, it is now possible for an autonomous vehicle to transport a user who is not fully competent (e.g., a child user, a senior citizen user, or a mentally challenged user) without a fully competent user being present. However, in such a situation, a user who is not fully competent may misuse the capabilities of the autonomous vehicle while in transit. Such misuse may lead to undesirable situations (e.g., a child requesting to go to a wrong location), or even dangerous situations (e.g., a child opening a door while the car is still in motion, or a child unbuckling a seat belt). Consequently, what is needed is an autonomous vehicle with a mode of operation that is appropriate for transporting users who are not fully competent.

SUMMARY

In accordance with the present disclosure, systems and methods are provided that improve the operation of an autonomous vehicle by providing a guardian mode for safe and secure transportation of a user who is not fully competent (e.g., a child).

In some embodiments, embodiments described below may be performed by a processing circuitry. The processing circuitry may be implemented as a part of an autonomous vehicle, a user device, a server, or as a part of the combination thereof. In some embodiments, the processing circuitry may receive a destination input may be received from a user. For example, a guardian user (e.g., a parent or any other fully competent user) may provide an input that includes a geographical destination for a passenger of an autonomous vehicle who is not fully competent (e.g., a child user). For example, a parent may request a ride for her child, where the child is transported from home to school. In some embodiments, the processing circuitry may receive a mode selection input from the user that identifies a driving mode. For example, the parent user may specify whether the requested trip is for a child user or whether an adult user will also be present.

In some embodiments, the processing circuitry may determine a selected route based on the destination input. For example, the processing circuitry may calculate turn-by-turn directions for driving to the child's school from the child's home.

In some embodiments, the processing circuitry may determine that the mode selection input identifies a regular driving mode. For example, the parent user may have indicated that he or she will be present inside the autonomous vehicle during the trip. In response, the processing circuitry may operate the autonomous vehicle to travel along the selected route in the regular driving mode. In the regular driving mode at least one capability of a first plurality of capabilities of the autonomous vehicle is enabled. For example, the autonomous vehicle may enable such capabilities as an ability to open windows, an ability to select music, or an ability to change the destination while in transit.

In some embodiments, the processing circuitry may determine that the mode selection input identifies a guardian mode. For example, the parent user may have indicated that only a child will be present inside the autonomous vehicle during the trip. In response, the processing circuitry may operate the autonomous vehicle to travel along the selected route in the guardian mode. In the guardian mode at least one capability of a first plurality of capabilities of the autonomous vehicle is disabled. For example, the autonomous vehicle may disable such capabilities as an ability to open windows, an ability to select music, or an ability to change the destination while in-transit.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

DETAILED DESCRIPTION

The present disclosure is directed to operating an autonomous vehicle in a guardian mode. The guardian mode may be requested by a fully competent user (e.g., a parent user) when the user requests transportation via the autonomous vehicle for a user who is not fully competent (e.g., a child user). The guardian mode may also be automatically activated when transportation is requested by a user who is not fully competent (e.g., when a child requests transportation after an afterschool activity has finished). In some embodiments, when the autonomous vehicle transports a child in the guardian mode, certain capabilities of the autonomous vehicle may be disabled. For example, the autonomous vehicle, to increase safety, may disable the ability for the user inside of the vehicle to disengage the seat belt, open windows and doors, or change the destination of the autonomous vehicle. In other examples, to prevent unauthorized spending, the autonomous vehicle may disable the ability of the user to select music, engage in e-commerce, or access the Internet. In some embodiments, these capabilities may be enabled when the autonomous vehicle is operated in a regular driving mode.

As referred to herein, the term "autonomous vehicle" refers to any kind of a transportation device (e.g., a car, a truck, a bus, an airplane, a boat, etc.) that may navigate, drive, or move between geographical locations without direct control by a human operator or driver.

As referred to herein, the term "regular driving mode" refers to a mode of operating an autonomous vehicle for a fully competent user. In some embodiments, while operating in the regular driving mode, the user being transported by the autonomous vehicle may have full access to the capabilities of the vehicle, and may receive maximal available privacy (e.g., user tracking capabilities or reporting capabilities may be disabled).

As referred to herein, the term "guardian mode" refers to a mode of operating an autonomous vehicle for a user who is not fully component (e.g., a child user, a senior citizen user, or a mentally handicapped user). In some embodiments, while operating in the regular driving mode, the user being transported by the autonomous vehicle may have limited access to capabilities of the vehicle, while some of the user tracking capabilities or reporting capabilities may be enabled.

Figure 1A:
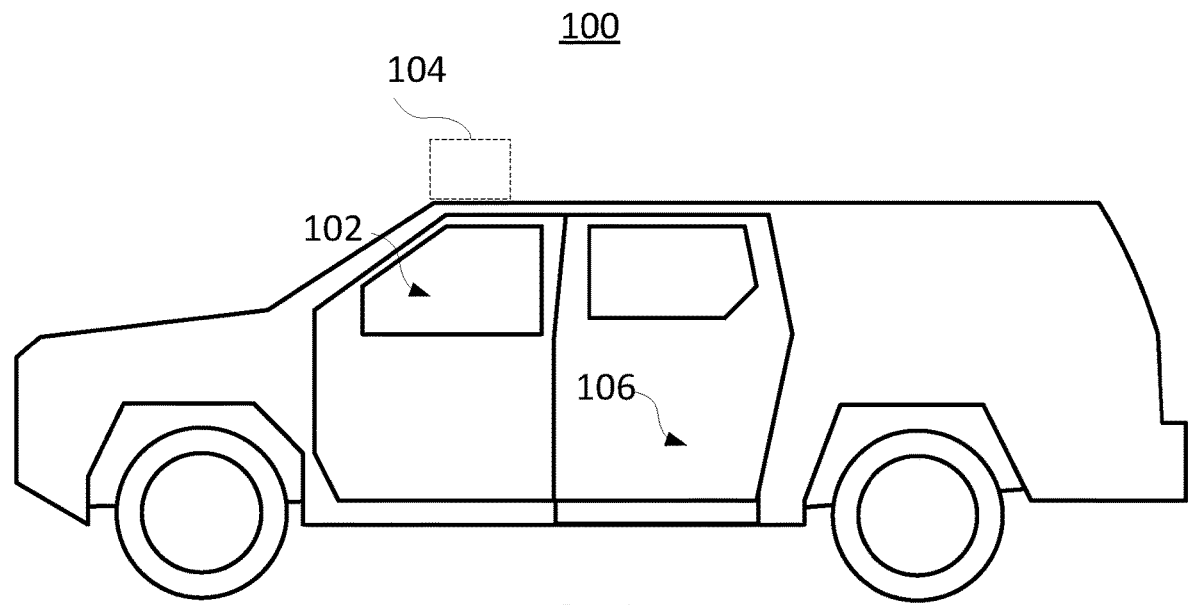
FIG. 1A shows a side view of an illustrative autonomous vehicle in accordance with some embodiments of the present disclosure.

FIG. 1A shows a side view of an illustrative autonomous vehicle 100 in accordance with some embodiments of the present disclosure. In some embodiments, autonomous vehicle 100 may be a coupe, a sedan, a truck, a bus, or any other type vehicle. In some embodiments, autonomous vehicle 100 may have a capability of being operated without direct control by a human operator or driver.

In some embodiments, autonomous vehicle 100 may include a plurality of external sensors 104. For example, some of the external sensors 104 may be mounted on the roof of autonomous vehicle 100. In some embodiments, external sensors 104 may be attached to any other part of the autonomous vehicle 100. In some embodiments, external sensors 104 may include video sensors, audio sensors, gas sensors, pressure sensors, GPS sensors, radio antennas, or any combination thereof.

In some embodiments, autonomous vehicle 100 may be capable of autonomous operation based on input received from external sensors 104. For example, autonomous vehicle 100 may use the GPS sensors to ascertain its geographical position, while the camera sensors may be used to detect the presence of other objects, enabling autonomous vehicle 100 to navigate to a destination while safely avoiding obstacles.

In some embodiments, autonomous vehicle 100 may include elements that may be directly controlled by autonomous vehicle 100 without human inputs. For example, autonomous vehicle 100 may include an engine, a transmission, wheel controls, turn signals, and other elements commonly found in vehicles. In some embodiments, autonomous vehicle 100 may directly control operation of such elements in order to autonomously operate (e.g., drive) autonomous vehicle 100 to a destination.

In some embodiments, autonomous vehicle 100 may include elements that are not directly used to drive autonomous vehicle 100. For example, autonomous vehicle 100 may include window 102 and door 106 (as well as other windows and doors). In some embodiments, autonomous vehicle 100 may have a capability to operate such elements. For example, autonomous vehicle 100 may have a capability to automatically open and close window 102 (as well other windows). In another example, autonomous vehicle 100 may have a capability to automatically open and close door 106 (as well other doors). In some embodiments, window 102 and door 106 (as well as other windows and doors) may have a capability to be operated by a human user. In some embodiments, autonomous vehicle 100 may have a capability to prevent the user from operating window 102 and door 106 (as well as other windows and doors) during certain periods of time (e.g., when it is unsafe to do so).

Figure 1B:
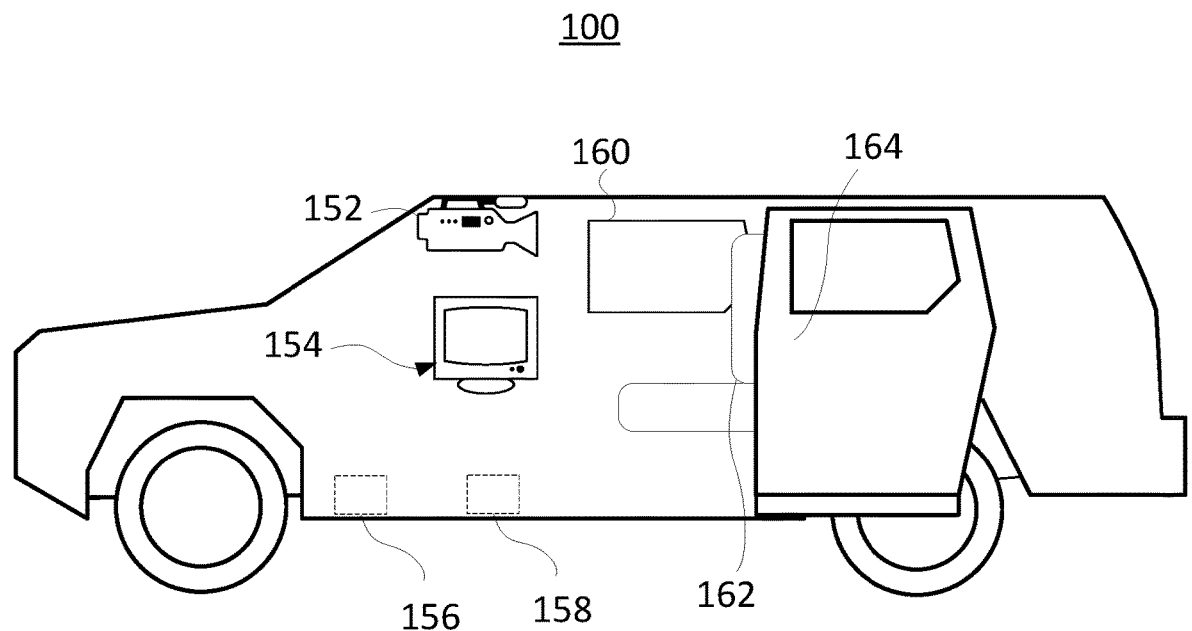
FIG. 1B shows another side view of an illustrative autonomous vehicle in accordance with some embodiments of the present disclosure.

FIG. 1B shows another side view of illustrative autonomous vehicle 100 in accordance with some embodiments of the present disclosure. FIG. 1B, among other things, illustrates interior elements of exemplary autonomous vehicle 100.

In some embodiments, autonomous vehicle 100 may include a set of internal elements. In some embodiments, autonomous vehicle 100 may include circuitry 156 for controlling the operation of autonomous vehicle 100. For example, circuitry 156 may include a circuitry processor, a hardware processor, a software processor (e.g., a processor emulated using a virtual machine), or any combination thereof. In some embodiments, circuitry 156 may include non-transitory memory storing instructions, for operating autonomous vehicle 100. For example, the instructions when executed by the processor, may cause the processor to operate autonomous vehicle 100 in accordance with embodiments described above and below.

In some embodiments, circuitry 156 may be in communicative connection with some or all other elements of autonomous vehicle 100 shown in FIGS. 1A and 1B. For example, circuitry 156 may be connected to such elements via one or more wires, or by a wireless communication. In some embodiments, circuitry 156 may receive input from external sensors 104, process the input, and operate any one or all of: an engine, a transmission, wheel controls, turn signals, and other elements commonly found in vehicles in order to drive autonomous vehicle 100. In some embodiments, circuitry 156 may receive input from any other element of autonomous vehicle 100. In some embodiments, circuitry 156 may send commands to operate any other element of autonomous vehicle 100. In some embodiments, circuitry 156 may include communication elements (e.g., an antenna, a set of antennas, a set of transceivers) for communicating with other devices external to autonomous vehicle 100 (e.g., user devices, servers, third-party data providers, etc.)

In some embodiments, autonomous vehicle 100 may include an internal camera 152 (e.g., a video camera, an IR camera, any other camera, or any combination thereof). In some embodiments, camera 152 may be positioned to capture the current conditions of autonomous vehicle 100. In some embodiments, video camera 152 may provide a video feed to circuitry 156. In some embodiments, circuitry 156 may receive input from camera 152. In some embodiments, autonomous vehicle 100 may control camera 152. For example, autonomous vehicle 100 may control direction, focus, angle, any other feature of camera 152, or any combination thereof. In some embodiments, camera 152 may also include a microphone or another audio capture device. In some embodiments, autonomous vehicle 100 may separately include a microphone or another audio capture device.

In some embodiments, autonomous vehicle 100 may include a display 154. For example, display 154 may be an LCD display, an OLED display, an LED display, or any other type of display. In some embodiments, display 154 may be a touch screen display with input capabilities. In some embodiments, circuitry 156 may provide a picture output to display 154. In some embodiments, circuitry 156 may receive input from display 154 (e.g., user input received via a touch screen).

In some embodiments, display 154 may act as user interface for controlling autonomous vehicle 100. For example, display 154 may present an interface for the user to input a destination for autonomous vehicle 100. In some embodiments, display 154 may provide options to control other elements of autonomous vehicle 100. For example, a user may be able to, via the interface presented on display 154, control the music output, door 106, window 160, camera 152, display 154, any other element of autonomous vehicle 100, or any combination thereof.

In some embodiments, autonomous vehicle 100 may include other sensors and controls. For example, circuitry 156 may control opening and closing of doors 106, opening and closing of windows 160, or opening and closing of any other door or windows of autonomous vehicle 100. In some embodiments, circuitry 156 may control seat belt mechanism 162. For example, circuitry 156 may prevent seat belt mechanism 162 from being disengaged during certain periods of time.

In some embodiments, autonomous vehicle 100 may contain a plurality of other sensors 158. For example, autonomous vehicle 100 may include gas sensors (e.g., spectrum analyzers) configured to detect the presence of a specific gas and the concentration levels of that gas. In some embodiments, autonomous vehicle 100 may include one or more pressure sensors that may detect presence of pressure at various points in the vehicle. In some embodiments, autonomous vehicle 100 may include one or more weight sensors that may detect weight at specific points in vehicle 100 or the total weight of vehicle 100.

In some embodiments, autonomous vehicle 100 may include other features. In some embodiments, autonomous vehicle 100 may include speakers for playing sounds, music, or enabling a person to communicate with a person being transported, and a climate control system for ventilating the vehicle and increasing or decreasing the temperature inside vehicle 100.

Figure 2:
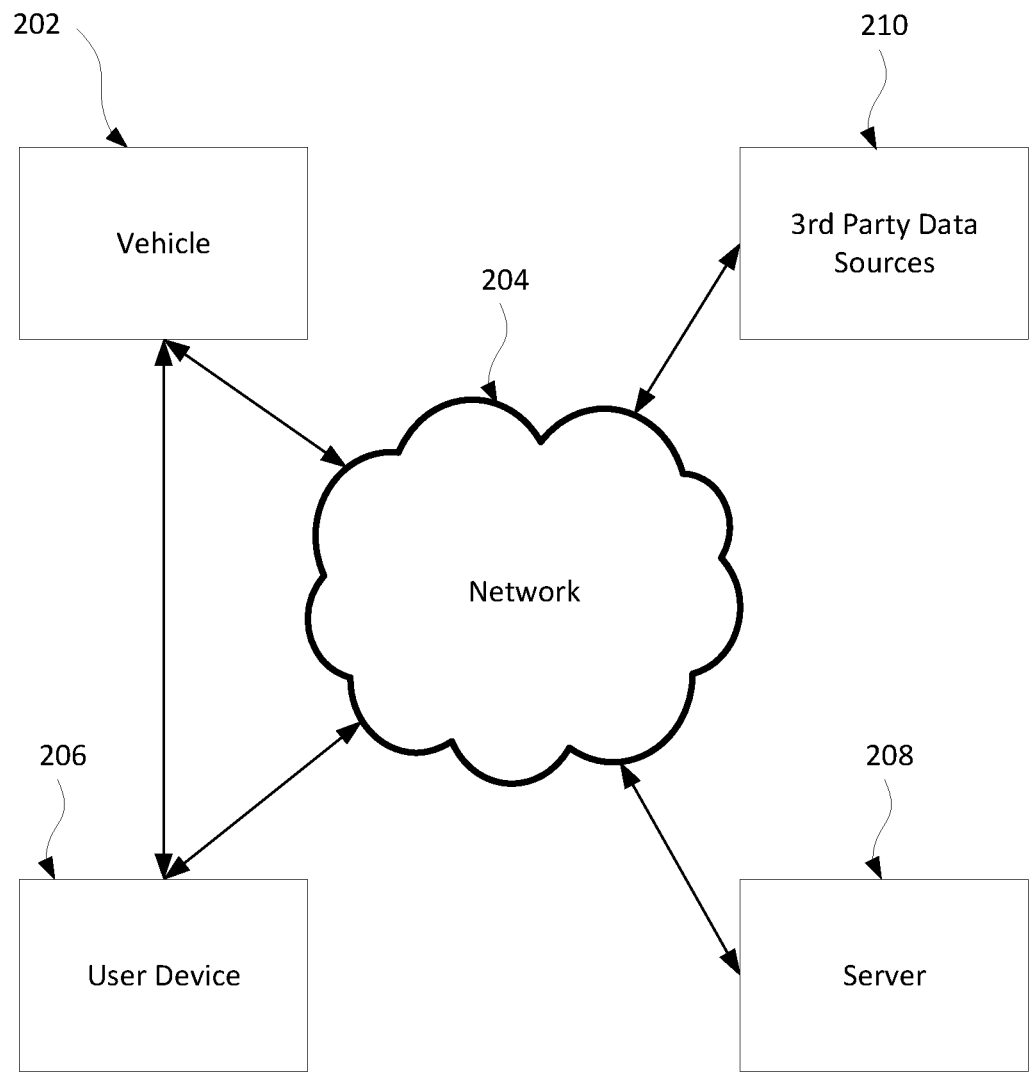
FIG. 2 shows a block diagram for a system for operating an autonomous vehicle, in accordance with some embodiments of the present disclosure.

FIG. 2 shows a block diagram for a system 200 for operating an autonomous vehicle in accordance with some embodiments of the present disclosure. System 200 may include vehicle 202 (e.g., autonomous vehicle 100), user device 206, server 208, and third-party data sources 210.

In some embodiments, system 200 may include network 204 communicatively interconnecting vehicle 202, user device 206, server 208, and third-party data sources 210. In some embodiments, network 204 may be the Internet, intranet, Bluetooth network, LAN, WAN, a Wi-Fi network, any other wired or wireless network, or any combination thereof.

In some embodiments, user device 206 may be a smartphone, a laptop, a computer, any consumer electronic device, or any combination thereof. In some embodiments, user device 206 may be communicatively connected to vehicle 202. In some embodiments, user device 206 may send commands and/or instructions to the vehicle 202 via the communicative connection. For example, user device 206 may control functions of vehicle 202 via the communicative connection.

In some embodiments, user device 206 may be directly connected to vehicle 202. For example, user device 206 may be communicatively connected to vehicle 202 via Bluetooth or via NFC field. For example, circuitry 156 of FIG. 1 may include a Bluetooth or NFC transceiver for connecting to the device 202. In another example, user device 206 may be communicatively connected to vehicle 202 via a wired connection (e.g., via a wired port inside of vehicle 202).

In some embodiments, user device 206 may be communicatively connected to vehicle 202 via network 204. For example, commands from user device 206 may be transmitted to vehicle 202 via network 204. For example, circuitry 156 of FIG. 1 may include a Wi-Fi or cellular transceiver for connecting to network 204. Similarity, vehicle 202 may send data and acknowledgements to user device 206 via network 204. In some embodiments, user device 206 may be connected to vehicle 202 via server 208. For example, user device 206 may send command to server 208 (e.g., via network 204), while server 208 may forward these commands to vehicle 202.

In some embodiments, a user may control vehicle 202 via user device 206. For example, the user may enter the destination for the vehicle 202. In some embodiments, the user may control elements of vehicle 202 via user device 206. For example, the user may open and close doors and windows, play music, play video, or control the climate control system. In some embodiments, the user may control any other capability of vehicle 202 via input on user device 206 (e.g., via custom app or application executing on user device 206).

In some embodiments, server 208 may comprise a single web server. In some embodiments, server 208 may comprise a plurality of servers distributed in one or more facilities. In some embodiments, server 208 may provide information to vehicle 202 (e.g., information requested by user device 206). In some embodiments, vehicle 202 may be operated entirely via instructions executing on server 208. That is, server 208 may control all elements of vehicle 202 (e.g., elements of autonomous vehicle 100), while vehicle 202 may only have circuitry sufficient to send sensor data to server 208 and receive commands from server 208. In some embodiments, server 208 may connect to the network via a cellular transceiver for connecting to a cellular network (or via any other kind of transceiver).

In some embodiments, any of vehicle 202, user device 206, and server 208 may communicate to third-party sources 210 via network 204. Third-party sources 210 may include websites or private databases configured to provide requested data. For example, third-party sources 210 may provide up-to-date traffic, weather, or financial information needed for operation of vehicle 202. In some embodiments, third-party sources 210 may provide any other kind of data or information.

In some embodiments, server 208 may comprise memory storing instructions for controlling vehicle 202. For example, a processor of server 208 may execute such instructions to generate a control signal. The control signal for controlling vehicle 202 may then be transmitted to vehicle 202 over network 204. Vehicle 202 may then be operated according to the received control signal.

In some embodiments, instructions for controlling vehicle may be distributed between vehicle 202, user device 206, server 208 or any combination thereof. In such embodiments, respective processors of vehicle 202, user device 206, server 208 may execute their part of the instructions or jointly generate a control signal for controlling vehicle 202.

For example, user device 206 may be used to transmit requests for a trip via an autonomous vehicle. In some embodiments, the request may be transmitted to server 208 via network 204. In some embodiments, server 208 may select a vehicle for the requested. For example, vehicle 202 may be selected based on location and availability of vehicle 202. In some embodiments, circuity of vehicle 202 may then compute route and configure itself based on the request. In some embodiments, vehicle 202 may then provide status information to server 208. Server 208, may then provide status information regarding vehicle 202 to user device 206 (or other user devices.)

Figure 3:
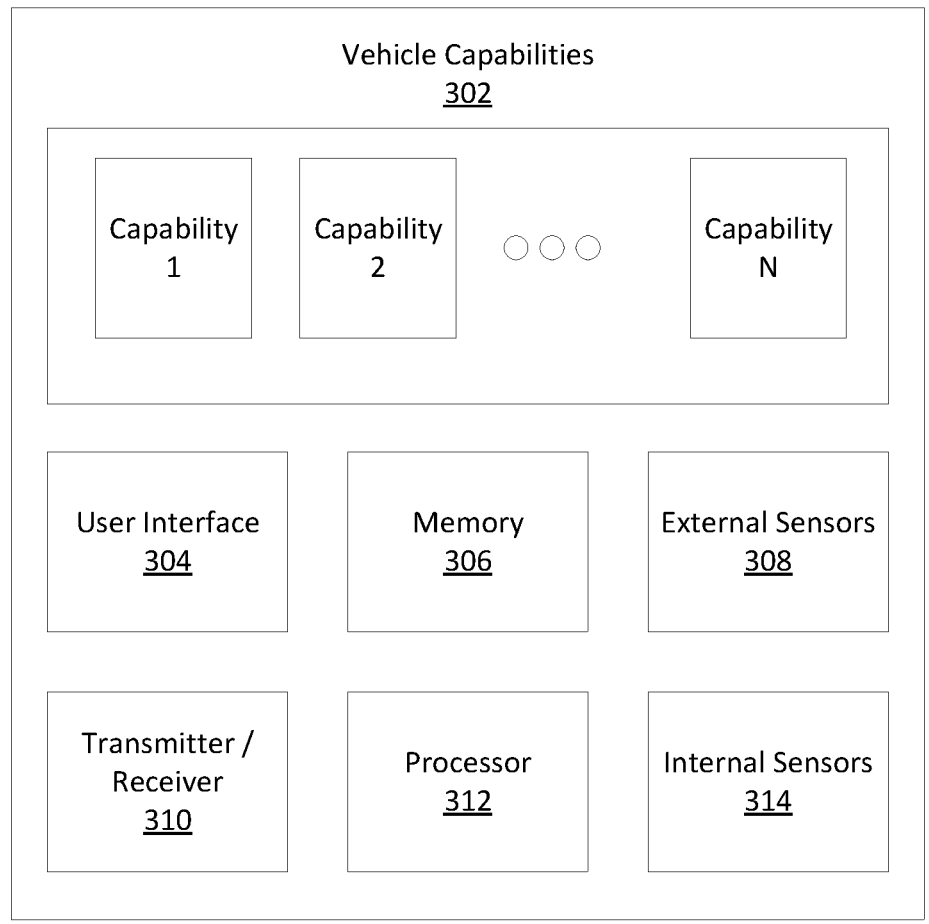
FIG. 3 shows a block diagram of components of an autonomous vehicle, in accordance with some embodiments of the present disclosure.

FIG. 3 shows a block diagram of components of autonomous vehicle 300 (e.g., autonomous vehicle 100 or vehicle 202), in accordance with some embodiments of the present disclosure. In some embodiments, vehicle 300 may include processor 312. Processor 312 may comprise a hardware CPU for executing commands stored in memory 306 or software modules, or combination thereof. In some embodiments, processor 312 may be a part of circuitry 156 of FIG. 1B.

In some embodiments, vehicle 300 may include memory 303. In some embodiments, memory 306 may be a part of circuitry 156 of FIG. 1B. In some embodiments, memory 306 may include hardware elements for non-transitory storage of commands or instructions, that, when executed by processor 312, cause processor 312 to operate vehicle 300 in accordance with embodiments described above and below.

In some embodiments, processor 312 may be communicatively connected to external sensors 308 (e.g., sensors 104 of FIG. 1A), internal sensors 314 (e.g., sensors 158 of FIG. 1B), transmitter/receiver 310, and user interface 304. External sensors 308 may include video sensors, audio sensors, gas sensors, pressure sensors, GPS sensors, radio antennas, any other sensors, or any combination thereof. Internal sensors 314 may include video cameras, microphones, pressure sensors, weight sensors, gas sensors, sensors specific to vehicle capabilities 302, any other sensors, or any combination thereof.

In some embodiments, processor 312 may use data from external sensors 308 and internal sensors 314 to drive the vehicle and/or to perform other functions. In some embodiments, processor 312 may receive user input via user interface 304. In some embodiments, a user interface may include a screen (e.g. screen 154 of FIG. 1). In some embodiments, processor 312 may communicate with a user device (e.g., user device 206 of FIG. 2), a server (e.g., server 308 of FIG. 2), and other data sources (e.g., third-party data sources 210 of FIG. 2) via a network (e.g., network 204 of FIG. 2) that may be accessed via transmitter/receiver 310.

In some embodiments, vehicle 300 may include a plurality of capabilities 302 (e.g., capabilities 1-N). In some embodiments, each of capabilities 1-N may be controlled by processor 312. For example, processor 312 may gather inputs from any of the elements of vehicle 300, analyze the inputs, and enable or disable any of capabilities 1-N based on the analysis and based on the current mode of operation.

In some embodiments, capabilities 302 may include a window control capability. For example, vehicle 300 may include a user interface (e.g., a hardware or software switch) for opening and closing windows (e.g., windows 102 and 160 of FIGS. 1A-B). In some embodiments, windows may be controlled via input from a user device. In some embodiments, processor 312 may enable or disable the ability of the user to control windows at different times (e.g., based on the current mode of operation).

In some embodiments, capabilities 302 may include a door control capability. For example, vehicle 300 may include a user interface (e.g., a hardware or software switch) for opening and closing doors (e.g., door 106 of FIG. 1A). In some embodiments, doors may be controlled via input from a user device. In some embodiments, processor 312 may enable or disable the ability of the user to control doors at different times (e.g., based on the current mode of operation).

In some embodiments, capabilities 302 may include a route selection control capability. For example, vehicle 300 may include a user interface for route selection (e.g., via user interface 304). In some embodiments, the user may also be able to select a route via user device 206 of FIG. 2. In some embodiments, processor 312 may enable or disable the ability of the user to select a route at different times (e.g., based on the current mode of operation).

In some embodiments, capabilities 302 may include a music or radio selection control capability. For example, vehicle 300 may include a user interface for selecting music to be played. In some embodiments, music selection may be controlled via input from a user device (e.g., user device 206 of FIG. 2). In some embodiments, processor 312 may enable or disable the ability of the user to select music or radio stations at different times (e.g., based on the current mode of operation).

In some embodiments, capabilities 302 may include climate control capability. For example, vehicle 300 may include a user interface for adjusting temperature inside vehicle 300 (e.g., via turning on or off fans, heaters, warmers, or air conditioning elements of vehicle 300). In some embodiments, the climate may be controlled via input from a user device (e.g., user device 206 of FIG. 2). In some embodiments, processor 312 may enable or disable the ability of the user to control the climate at different times (e.g., based on the current mode of operation).

In some embodiments, capabilities 302 may include e-commerce capability. For example, vehicle 300 may include a user interface for making purchases. In some embodiments, purchases may be made via a user voice command, or via interface displayed on display 154. In some embodiments, processor 312 may enable or disable the ability of the user to engage in e-commerce at different times (e.g., based on the current mode of operation).

In some embodiments, capabilities 302 may include a seat belt unlocking capability. For example, vehicle 300 may include a user interface (e.g., a hardware button or software switch) for disengaging a seat belt (e.g., via seat belt mechanism 162 of FIG. 1B). In some embodiments, a seat belt may be engaged or disengaged via input from a user device (e.g., user device 206 of FIG. 2). In some embodiments, processor 312 may enable or disable seat belt unlocking capability at different times (e.g., based on the current mode of operation).

In some embodiments, capabilities 302 may include Internet access capability. For example, vehicle 300 may include a user interface for accessing websites via the Internet. In some embodiments, the Internet access may be provided via display 154 of FIG. 1B. In some embodiments, vehicle 300 may provide a Wi-Fi signal enabling user device 206 of FIG. 2 to access the Internet. In some embodiments, processor 312 may enable or disable the ability of the user to access the Internet at different times (e.g., based on the current mode of operation).

In some embodiments, capabilities 302 may include an autonomous vehicle location reporting capability. In some embodiments, processor 312 may be able to determine the current location of vehicle 300 (e.g., via GPS input). In some embodiments, processor 312 may be able to report the current location of vehicle 300 to an external device (e.g., user device 206 of FIG. 2, server 208 of FIG. 2 or any other device). In some embodiments, processor 312 may enable or disable location reporting capability at different times (e.g., based on the current mode of operation).

In some embodiments, capabilities 302 may include a geofence violation warning capability. In some embodiments, processor 312 may be able to determine the current location of vehicle 300 (e.g., via GPS input). In some embodiments, vehicle 300 may store (e.g., in memory 306) a geofence definition. For example, a geofence may be defined as a three-mile radius around the user's home or as any other geographical area. In some embodiments, processor 312 may be able to generate reports when the current location of vehicle 300 is outside the defined geofence. In some embodiments, the report may be sent to an external device (e.g., user device 206 of FIG. 2, server 208 of FIG. 2 or any other device). In some embodiments, processor 312 may enable or disable geofence violation warning capability at different times (e.g., based on the current mode of operation).

In some embodiments, capabilities 302 may include password control capability. In some embodiments, other capabilities 302 may be enabled or disabled only when a password is entered (e.g., via user interface 304). For example, if the user desires to input a new destination, processor 312 may require the user to meet a password challenge if the password control capability is enabled. In some embodiments, processor 312 may enable or disable the password control capability at different times (e.g., based on the current mode of operation).

In some embodiments, capabilities 302 may include a camera feed capability. In some embodiments, processor 312 may be able to gather video feed data from cameras inside or outside of the vehicle (e.g., camera 152 of FIG. 1B). In some embodiments, processor 312 may be able to send the camera feed to an external device (e.g., user device 206 of FIG. 2, server 208 of FIG. 2 or any other device). In some embodiments, processor 312 may enable or disable camera feed capability at different times (e.g., based on the current mode of operation).

In some embodiments, capabilities 302 may include a sound feed capability. In some embodiments, processor 312 may be able to gather sound feed data from microphones inside or outside of the vehicle (e.g., a camera 152 of FIG. 1B may include a microphone). In some embodiments, processor 312 may be able to send the sound feed to an external device (e.g., user device 206 of FIG. 2, server 208 of FIG. 2 or any other device). In some embodiments, processor 312 may enable or disable sound feed capability at different times (e.g., based on the current mode of operation).

Figure 4:
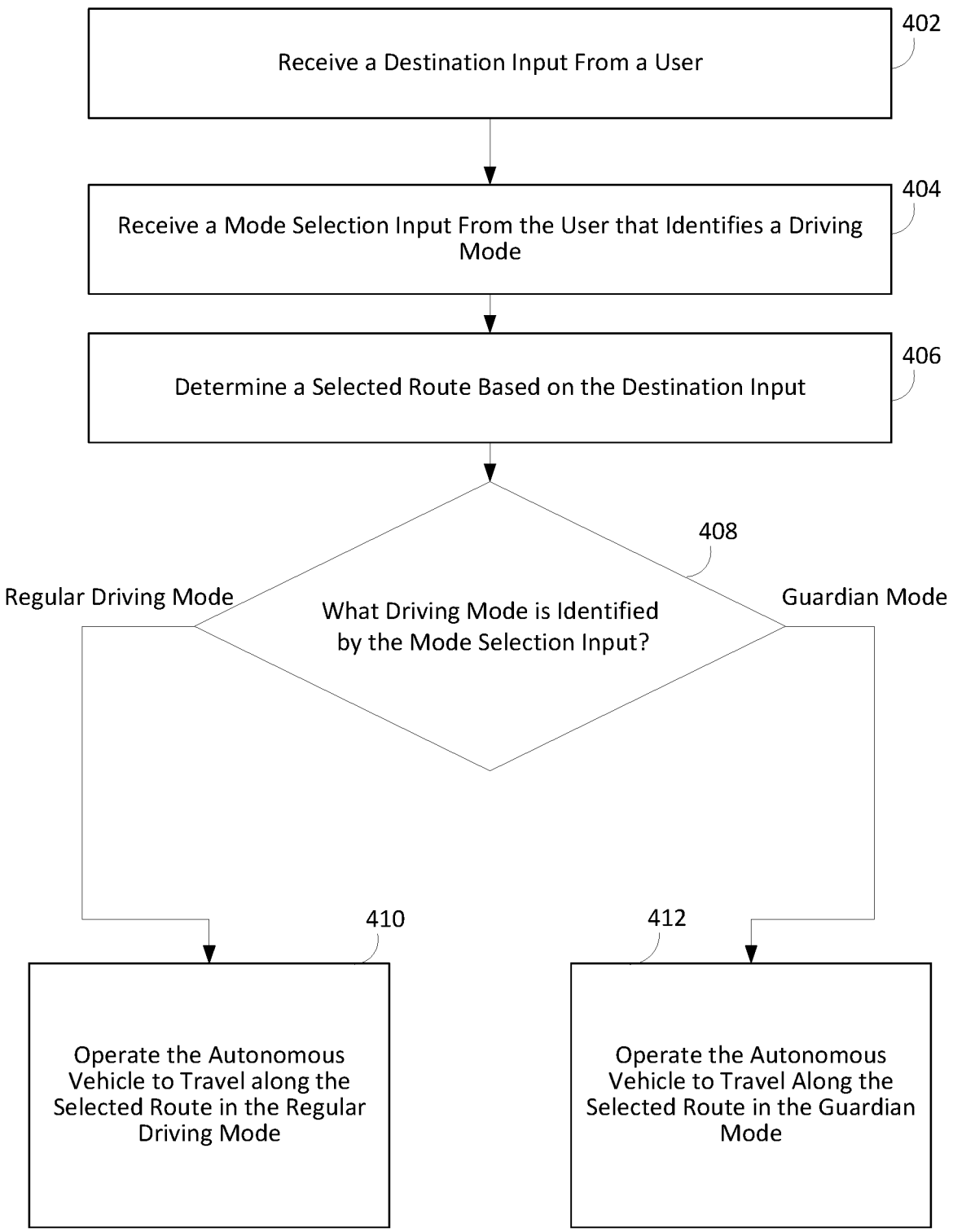
FIG. 4 depicts an illustrative flow diagram of a process for operating an autonomous vehicle in several modes, in accordance with some embodiments of the disclosure.

FIG. 4 depicts an illustrative flow diagram of a process 400 for operating an autonomous vehicle in several modes in accordance with several embodiments of the disclosure. In some embodiments, process 400 may be executed by processing circuitry of an autonomous vehicle 100 (FIGS. 1A-B), 202 (FIG. 2), or 300 (FIG. 3). In some embodiments, the processing circuitry may be one of circuitry 156 of FIG. 1B or processor 312 of FIG. 3. In some embodiments, the processing circuitry may perform process 400 by execution of instructions stored in memory (e.g., memory 306 of FIG. 3). In some embodiments, the processing circuitry may be a part of server 208 of FIG. 2, which may control autonomous vehicle 202 via a command transmitted over network 204. In some embodiments, the processing circuitry may be distributed across multiple devices.

Process 400 begins at 402, where the processing circuitry (e.g., of a user device or an autonomous vehicle) may receive a destination input from a user. For example, the destination input may include an input of an address, or GPS coordinates of a geographical location. In some embodiments, the destination input may be received from a user interface located inside the vehicle (e.g., user interface 304). In some embodiments, the destination input may be received from a user device (e.g., user device 206). In some embodiments, the user input may also include an origin point. For example, the user may request a ride from a first geographical location to a second geographical location. For example, the user may request a ride for his or her child from home to school. For example, the user may enter the street address of the school using the interface of a user device. In some embodiments, the user may then request transport via an autonomous vehicle to the entered address.

Process 400 continues at 404, where the processing circuitry may receive a mode selection input from the user that identifies a driving mode. For example, the user may specify whether the autonomous vehicle should operate in a regular driving mode or in a guardian mode. In some embodiments, the user may also select other modes (e.g., maintenance mode, funeral procession mode, etc.) For example, the user may specify that a child is to be transported in a guardian mode.

In some embodiments, the user selection of the mode may be explicit. For example, the user may check a box on a user interface indicating a selection of the mode. For example, if the user is requesting transportation for a child user, a senior citizen user, or a mentally handicapped user, the user may check a "guardian mode" checkbox on the user interface. In some embodiments, if the user is ordering a trip for herself or for another competent adult user, the user may check a "regular driving mode" checkbox on the user interface. In some embodiments, if no other mode is selected, the processing circuitry may default to the "regular driving mode."

In some embodiments, the processing circuitry may receive an implied mode selection. For example, the processing circuitry may interpret a request to transport a child as selection of a guardian mode by the user. In another example, the processing circuitry may interpret a request to transport a user to a location associated with a user who is not fully competent (e.g., a school location) as selection of a guardian mode by the user.

Process 400 continues at 406, where the processing circuitry may determine a selected route based on the destination input. In some embodiments, the processing circuitry may have also received an origin point from the user. In some embodiments, the processing circuitry may determine the origin point based on a sensor input (e.g., based on GPS data.)

In some embodiments, the processing circuitry may determine a selected route based on the destination input and the origin point. For example, if the destination input identifies a first geographical point and the origin point identifies a second geographical point, the processing circuitry may calculate a route between the first and second points. In some embodiments, the processing circuitry may calculate the route based on stored map data. In some embodiments, the processing circuitry may request a third-party source (e.g., one of third-party data sources 210 of FIG. 2) to calculate a route between the first and second points. For example, the processing circuitry may request turn-by-turn directions from a commercial map service (e.g., Google Maps).

Process 400 continues at 408, where the processing circuitry may determine whether the mode selection input identifies a regular driving mode or a guardian mode. If the mode selection input identifies a regular driving mode, process 400 may continue at 410. If the mode selection input identifies a guardian mode, process 400 may continue at 412. For example, if a competent user has requested a ride for himself, process 400 may continue at 410. In another example, if a competent user has requested a ride for a user who is not fully competent (e.g., a child), process 400 may continue at 412.

At 410, the processing circuitry may operate the autonomous vehicle to travel along the selected route in the regular driving mode. For example, if the user has requested a ride to work for herself, the autonomous vehicle may drive the user to work while operating in the regular driving mode. In some embodiments, while the autonomous vehicle is operating in the regular driving mode, at least one capability of a first plurality of capabilities (e.g., some of capabilities 302 of FIG. 3) of the autonomous vehicle is enabled. In some embodiments, the first plurality of capabilities may include capabilities that require input from a competent adult user. In some embodiments, while the autonomous vehicle is operating in the regular driving mode, at least one capability of a second plurality of capabilities (e.g., some of capabilities 302 of FIG. 3) of the autonomous vehicle is disabled. In some embodiments, the second plurality of capabilities may include capabilities designed to monitor or control behavior of a not-fully-competent user (e.g., a child user, a senior citizen user, or a mentally challenged user). For example, while the user is riding to work, she may be able to open the windows, select music, engage in shopping. Additionally, while the user is riding to work, location tracking and video camera feed may be disabled to provide privacy to the rider.

At 412, the processing circuitry may operate the autonomous vehicle to travel along the selected route in the guardian mode. In some embodiments, while the autonomous vehicle is operating in the guardian mode, at least one capability of a first plurality of capabilities (e.g., some of capabilities 302 of FIG. 3) of the autonomous vehicle is disabled. In some embodiments, while the autonomous vehicle is operating in the regular driving mode, at least one capability of a second plurality of capabilities (e.g., some of capabilities 302) of the autonomous vehicle is enabled. For example, while a child user is being transported to school, he may not be able to open the windows, select music (alternatively music section may be limited instead of being disabled), engage in shopping, or disconnect the seat belt. Additionally, while the child user is riding to school, location tracking and a video camera feed may be enabled to enable the parent user to track her child.

In some embodiments, the first plurality of capabilities of the autonomous vehicle comprises at least two of: window control capability, route selection control capability, music or radio selection control capability, door opening/closing control capability, climate control capability, e-commerce capability, Internet access capability (alternatively Internet access may be limited instead of being disabled), and seat belt unlocking capability. That is, the first plurality of capabilities of the autonomous vehicle may include a plurality of capabilities that are appropriate only for a fully competent user.

For example, a child (or a different user who is not fully competent) may not be trusted with opening windows, selecting music, or changing the destination of the autonomous vehicle. Similarly, a child may not be trusted with disengaging the seat belt, accessing Internet or e-commerce options, or modifying the climate control settings. Consequently, at least one or all of such options may be disabled in the guardian mode, even if the autonomous vehicle has such capabilities.

In some embodiments, the second plurality of capabilities of the autonomous vehicle comprises at least two of autonomous vehicle location reporting capability, geofence violation warning capability, camera feed capability, sound feed capability, or weight sensor feed capability. That is, the second plurality of capabilities of the autonomous vehicle may include a plurality of capabilities that are needed for monitoring or controlling behavior of a user who is not fully competent.

For example, a parent may wish to be apprised of a location of his or her child. In this example, the processing circuitry may send periodic or real-time location updates to the user device of the parent. For example, the parent may be able to see a map with an icon that represents the current location of the child. In some embodiments, such location tracking may be enabled in a guardian mode, but disabled in the regular driving mode.

In some embodiments, a user (e.g., a parent) may also set a geofenced area for a child. In some embodiments, geofencing refers to defining a certain geographical area where a person (e.g. a child) is allowed, while all areas outside of the geographic are restricted. For example, all areas within three-mile radius of the child's house may be defined as the "geofenced." In this example, all areas more than three-miles away from the child's house are considered restricted. For example, an alarm may be generated when a person is detected to be outside of the geofenced area.

For example, the parent may visually define the geofence by drawing lines on a map. In another example, the parent may set a geofence as maximum distance from a certain point (e.g., home or school). In some embodiments, the processing circuitry may monitor the location of the autonomous vehicle, and determine whether the autonomous vehicle is outside of the geofence. In such situations, the processing circuitry may send a notification to the user (e.g., to the parent). For example, the parent may receive a text message or an app notification with text such as: "Warning! Your child is outside the geofenced area." In some embodiments, such geofence notifications may be enabled in a guardian mode, but disabled in the regular driving mode.

In some embodiments, some or all features or capabilities of the autonomous vehicle may be password-locked. For example, if a user inside a vehicle attempts to use a password-locked capability (e.g., unlocking a seat belt, opening the window, using Internet, or accessing any other capability of the autonomous vehicle), the processing circuitry may require a password. In some embodiments, a password may be set beforehand by a fully competent user (e.g., a parent). In some embodiments, the password challenge may appear on a display (e.g., display 154 of FIG. 1B). In some embodiments, once the password is entered, the capability may be unlocked. In some embodiments, such password control may be enabled in a guardian mode, but disabled in the regular driving mode.

In some embodiments, the processing circuitry may have access to a camera feed capability or an audio feed capability. For example, the processing circuitry may be able to receive video feed from a camera (e.g., camera 152 of FIG.

1B). In some embodiments, the processing circuitry may be able to further transmit the video feed to a user outside of the vehicle (e.g., via network 204). For example, a parent may receive the video feed of a child riding inside of the autonomous vehicle (e.g., via a user device 206 that may be in the parent's possession). In some embodiments, the feed may be presented at all times, on demand, or when an unusual occurrence is detected (e.g., if the vehicle stops for too long or leaves the geofenced area.) In some embodiments, camera feed capability may be enabled in a guardian mode, but disabled in the regular driving mode.

In some embodiments, the processing circuitry may provide other features while the autonomous vehicle operates in the guardian mode. For example, when operating in the guardian mode, the processing circuitry may disable door opening/closing control capability while the autonomous vehicle travels along the selected route. In some embodiments, the processing circuitry may automatically open a door of the autonomous vehicle when the autonomous vehicle reaches the end of the selected route and comes to a full stop. In some embodiments, the autonomous vehicle may unlock the doors when the autonomous vehicle reaches the end of the selected route and comes to a full stop and allow the user to manually open the door. In some embodiments, if the autonomous vehicle comes to a complete stop at a reasonable distance (e.g., 500 feet) from the destination for a threshold period of time (e.g., 5 minutes), the autonomous vehicle may automatically unlock the doors to allow the user to walk toward the destination. For example, if the autonomous vehicle is stuck in traffic within a walking distance from the school, the doors may be automatically unlocked.

In some embodiments, the processing circuitry may provide further limits on the capabilities of the autonomous vehicle while the autonomous vehicle operates in the guardian mode. For example, while the autonomous vehicle operates in the guardian mode, some users (e.g., not fully-competent users) may be restricted from requesting an autonomous vehicle transport to certain locations, restricted from requesting an autonomous vehicle transport at certain times, or restricted from requesting an autonomous vehicle transport to certain locations at certain times. For example, a child user may be able to request transport to a friend's house during the day hours (9:00 AM-9:00 PM), but not during the night hours (9:00 PM-9:00 AM).

In some embodiments, the guardian mode may provide any number of additional features or limitations, for example as described below in relation to FIGS. 5-9. Any of the methods disclosed in relation to FIGS. 5-9 can be performed individually, sequentially, or simultaneously by the processing circuitry.

In some embodiments, when the autonomous vehicle is operating in the guardian mode, the autonomous vehicle may establish a voice or video communication between the passenger of the autonomous vehicle (e.g., a child user) and a user who is outside of the autonomous vehicle (e.g., a parent user). In some embodiments, the communication is persistent. In some embodiments, the communication is persistent is only activate in emergency situations, or by request from the user or from the passenger.

Figure 5:
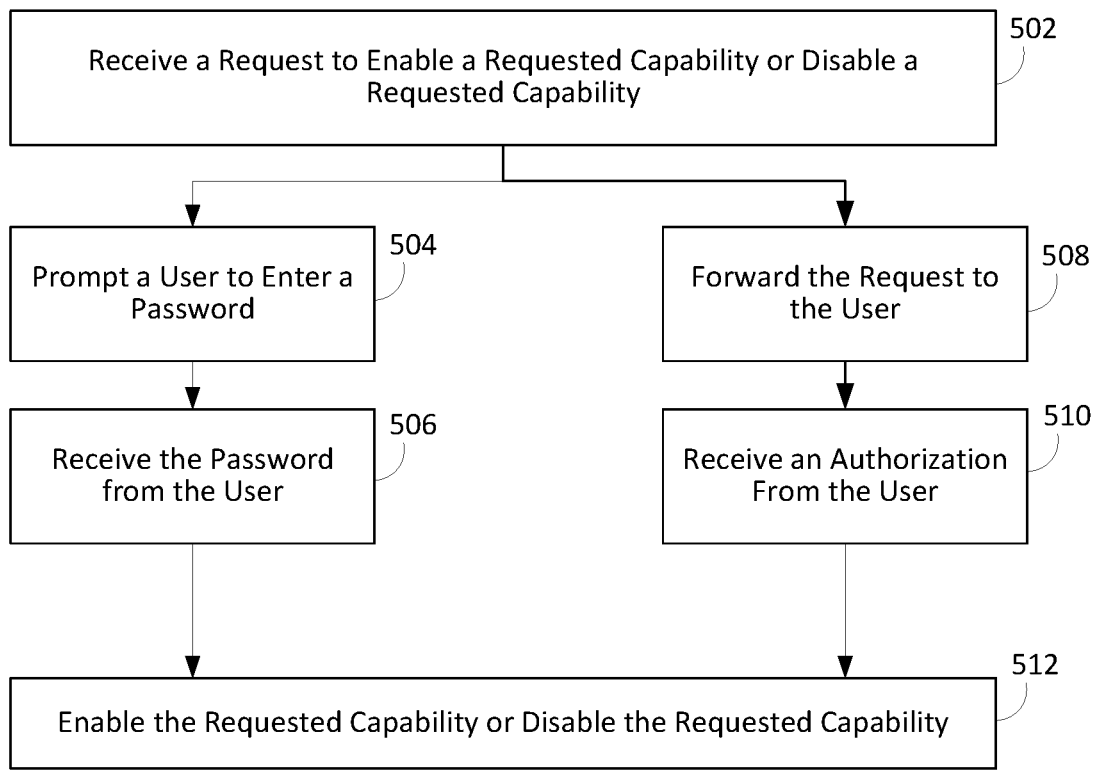
FIG. 5 depicts an illustrative flow diagram of a process for requesting a capability change while an autonomous vehicle is operating in the guardian mode, in accordance with some embodiments of the disclosure.

FIG. 5 depicts an illustrative flow diagram of a process 500 for requesting a capability change while an autonomous vehicle is operating in a guardian mode in accordance with an embodiment of the disclosure. In some embodiments, process 500 may be executed by a processing circuitry of autonomous vehicle 100 (FIGS. 1A-B), 202 (FIG. 2), or 300 (FIG. 3). In some embodiments, the processing circuitry may be one of circuitry 156 of FIG. 1B or processor 312 of FIG. 3. In some embodiments, the processing circuitry may perform process 500 by execution of instructions stored in memory (e.g., memory 306 of FIG. 3). In some embodiments, processing circuitry may be a part of server 208 of FIG. 2, which may control autonomous vehicle 202 via a command transmitted over network 204. In some embodiments, process 500 is performed as part of step 412 of FIG. 4.

Process 500 begins at 502, where the processing circuitry may receive a request to enable a requested capability of the first plurality of capabilities or disable a requested capability of the second plurality of capabilities. In some embodiments, a child user inside of a vehicle may request to access a capability of a vehicle that is disabled. For example, the child may attempt to open the window, access the Internet, turn on the music, or change a climate control setting. In some embodiments, the child user may, instead, explicitly request a permission via user interface of the vehicle or via personal device (e.g., a smartphone). In some embodiments, a child user inside of a vehicle may request that a capability of a vehicle that is disenabled during the guardian mode be enabled. For example, the child user may request an exception to the geofencing rules, or a suspension of video feed.

In some embodiments, process 500 may continue to either step 504 or step 508. In some embodiments, both step 504 and step 508 may be performed by the processing circuitry.

At 504, the processing circuitry may prompt a user (e.g., a user inside of the vehicle) to enter a password. For example, the prompt to enter a password may appear on a display (e.g., display 154 of FIG. 1B). In some embodiments, the processing circuitry may send a password request to a user device (e.g., user device 206 of FIG. 2) via a network (e.g., network 204 of FIG. 2). In some embodiments, the password may have been preset by a parent user on a previous occasion (e.g., while the trip was being requested).

Process 500 may continue at 506, where the processing circuitry may receive the password from the user. For example, the user inside the vehicle (e.g., the child user) may enter the password via touch screen display (e.g., display 154 of FIG. 1B) or via a personal device (e.g., user device 206 of FIG. 2). In some embodiments, if the password is determined to be correct, process 500 may proceed to step 512. If the password is incorrect or no password is received, the processing circuitry may deny the request to enable or disable the requested capability.

At 508, the processing circuitry may forward the received request to an authorized user (e.g., a parent user). The request may be forwarded to the user device (e.g., user device 206 of FIG. 2) via a network (e.g., network 204 of FIG. 2). For example, a parent may receive a request via an SMS message or via a push app notification on a smartphone. In some embodiments, the parent may receive a message with the text: "Your child is attempting to open a window, do you wish to authorize this request?"

Process 500 may continue at 510, where the processing circuitry may receive an authorization from the user (e.g., via network 204 of FIG. 2). For example, the user may permit the child to access the requested capability by clicking an appropriate button in an app, or by sending a "yes" SMS message. In response to receiving an authorization from the user, process 500 may proceed to step 512. If a denial message is received from the user or if no response is received from the user for a certain period of time (e.g., one minute), the processing circuitry may deny the request to enable or disable a requested capability.

At 512, the processing circuitry may enable the requested capability of the first plurality of capabilities or disable the requested capability of the second plurality of capabilities. For example, the child may be able to access the window control capability or music selection capability of the autonomous vehicle. In another example, the video feed may be turned off if the child needs some privacy. In some embodiments, any other capability of the autonomous vehicle may be enabled or disabled as requested. In some embodiments, the change may be temporary and may revert to the original state after a certain time period (e.g., three minutes).

Figure 6:
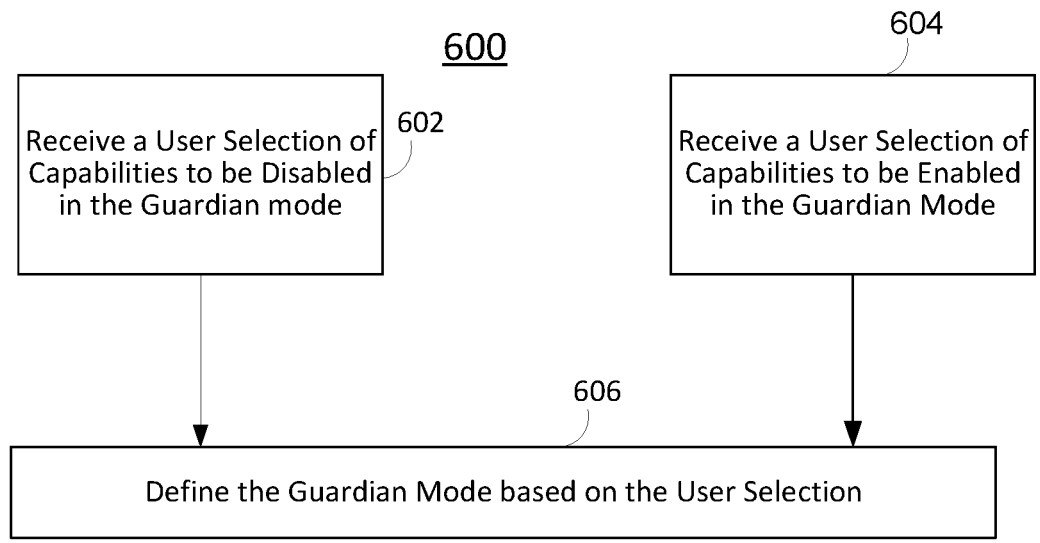
FIG. 6 depicts an illustrative flow diagram of a process for defining the guardian mode, in accordance with some embodiments of the disclosure.

FIG. 6 depicts an illustrative flow diagram of a process 600 for defining a guardian mode in accordance with an embodiment of the disclosure. In some embodiments, process 600 may be executed by processing circuitry of an autonomous vehicle 100 (FIGS. 1A-B), 202 (FIG. 2), or 300 (FIG. 3). In some embodiments, the processing circuitry may be one of circuitry 156 of FIG. 1 or processor 312 of FIG. 3. In some embodiments, the processing circuitry may perform process 500 by execution of instructions stored in memory (e.g., memory 306 of FIG. 3). In some embodiments, processing circuitry may be a part of server 208 of FIG. 2, which may control autonomous vehicle 202 via a command transmitted over network 204. In some embodiments, process 600 is performed as part of step 404 of FIG. 4.

Process 600 begins with steps 602 and 604, which may be performed individually, optionally, sequentially, or simultaneously by the processing circuitry.

At 602, the processing circuitry may receive a first user selection, wherein the first user selection identifies which capabilities of the autonomous vehicle are to be disabled in the guardian mode. For example, a parent user may be presented with a menu (e.g., on a user device 206 of FIG. 2) that lists all capabilities of the autonomous vehicle which may be disabled in the guardian mode (e.g., the first plurality of capabilities as described in relation to FIG. 4). The user (e.g., a parent user) may then select (e.g., by marking associated checkboxes) which of the capabilities of the autonomous vehicle are to be disabled in the guardian mode (e.g., in step 412). For example, a parent may select seat belt unlocking capability and Internet access capability to be disabled.

At 604, the processing circuitry may receive a second user selection, wherein the second user selection identifies which capabilities of the autonomous vehicle are to be enabled in the guardian mode. For example, a parent user may be presented with a menu (e.g., on a user device 206 of FIG. 2) that lists all capabilities of the autonomous vehicle which may be enabled in the guardian mode (e.g., the first plurality of capabilities as described in relation to FIG. 4). The user (e.g., a parent user) may then select (e.g., by marking associated checkboxes) which of the capabilities of the autonomous vehicle are to be enabled in guardian mode (e.g., in step 412). For example, a parent may select geofencing capability and video feed capability to be enabled.

Steps 602 and 604 are merely illustrative and capability's may be enabled or disabled in any other fashion. In some embodiments, steps 602 and 604 may be implemented in a single step, where a single list is provided and the user toggles between enabling and disabling the various capabilities. In some embodiments, capabilities listed in step 602 may be disable by default, while capabilities listed in step 604 may be enabled by default.

At 606, the processing may define the guardian mode for current or future use. For example, the processing circuitry may set which capabilities of the first plurality of capabilities of the autonomous vehicle are to be disabled in the guardian mode and set which capabilities of the second plurality of capabilities of the autonomous vehicle are to be enabled in the guardian mode based on the inputs received from the user at steps 602 and 604.

In some embodiments, the user may define more than one guardian mode. For example, the user may define a first guardian mode for a three-year-old child, a second guardian mode for a 15-year-old, and a third guardian mode for a 75-year-old grandfather. Each guardian mode may be configured to enable and disable different capabilities. For example, the first guardian mode may disable every capability of the first plurality of capabilities. In another example, the second guardian mode may let the 15-year-old child access certain capabilities, such as changing the music and accessing the Internet, but not other capabilities, such as opening the door or disengaging the seat belt. In yet another example, the third guardian mode may allow the 75-year-old grandfather to access all capabilities except for modifying the route or changing the destination.

In some embodiments, the autonomous vehicle may operate in different guardian modes based on who is currently riding in the autonomous vehicle. For example, the user (e.g., a parent user) may have defined a more restrictive first guardian mode for a first child user (e.g., a 6-year-old) and less restrictive second guardian mode for a second child user (e.g., a 13-year-old). In some embodiments, when both the first and second child users are riding in the autonomous vehicle, the least restrictive of the two guardian modes is used. In some embodiments, when the second child is dropped off, and the first child becomes a lone passenger, the autonomous vehicle may automatically switch to the more restrictive first guardian mode.

Figure 7:
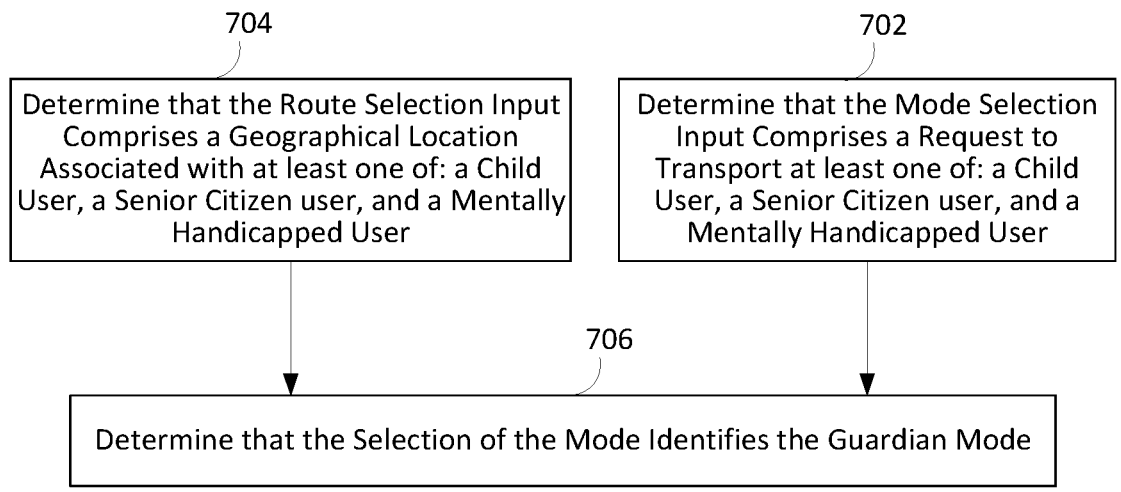
FIG. 7 depicts an illustrative flow diagram of a process for determining that the selection of the mode identifies the guardian mode, in accordance with some embodiments of the disclosure.

FIG. 7 depicts an illustrative flow diagram of process 700 for determining that the selection of the mode identifies a guardian mode in accordance with an embodiment of the disclosure. In some embodiments, process 700 may be executed by a processing circuitry of an autonomous vehicle 100 (FIGS. 1A-B), 202 (FIG. 2), or 300 (FIG. 3). In some embodiments, the processing circuitry may be one of circuitry 156 of FIG. 1B or processor 312 of FIG. 3. In some embodiments, the processing circuitry may perform process 500 by execution of instructions stored in memory (e.g., memory 306 of FIG. 3). In some embodiments, processing circuitry may be a part of server 208 of FIG. 2, which may control autonomous vehicle 202 via a command transmitted over network 204. In some embodiments, process 700 is performed as part of step 404 of FIG. 4.

At 702, the processing circuitry may determine that the mode selection input comprises a request to transport at least one of: a child user, a senior citizen use, and a mentally handicapped user. For example, the processing circuitry may receive an explicit request to transport a user who is not fully competent. For example, a parent may explicitly request transportation for a child (e.g., the input may specify that a child is to be transported to a requested destination, such as a school). In another example, a user may explicitly request transportation for a senior citizen (e.g., the input may specify that the grandfather is to be transported from his house to the user's house). If such requests are received, process 700 may continue to step 706.

At 704, the processing circuitry may determine that the route selection input comprises a geographical location associated with at least one of: a child user, a senior citizen user, and a mentally handicapped user. For example, the processing circuitry may determine that the user is requesting a trip to or from a school address associated with a child user (child's school), a house address associated with a senior citizen user (e.g., grandfather's house) or an address of a treatment facility associated with a mentally handicapped user (e.g., an outpatient treatment facility). If the processing circuitry makes such a determination, process 700 may continue to step 706.

At step 706, the processing circuitry may determine that a selection of the mode identifies the guardian mode based on determinations made in one of or both steps 702 and 704. Furthermore, in some embodiments, the processing circuitry may use the information acquired at steps 702 and/or 704 to determine if the guardian mode should be engaged. For example, if the user has requested transportation for a child at step 702, the processing circuitry may confirm that the identified user is inside the vehicle. For example, the processing circuitry may use an input from a camera (e.g., camera 152) to make a determination that the face of the user seated in a vehicle matches a picture of the child that is on file. In another example, the processing circuitry may use a weight sensor, a fingerprint sensor, or any other biometric sensor to confirm the identity of the child. In some embodiments, the processing circuitry may engage the guardian mode only when the identity is confirmed.

In some embodiments, if the user has requested transportation from a specific location in step 704, the processing circuitry may engage the guardian mode only when the autonomous vehicle arrives at the specific location. For example, if the user has requested transportation from a child's school to the user's home, the processing circuitry may activate the guardian mode only when the autonomous vehicle arrives at the child's school for pickup.

Figure 8:
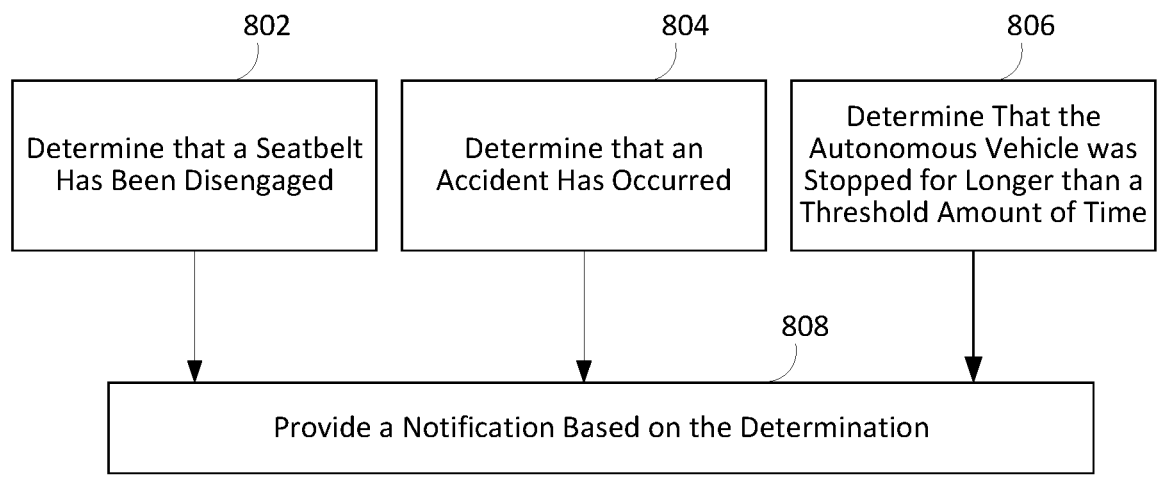
FIG. 8 depicts an illustrative flow diagram of a process for providing event notifications while an autonomous vehicle is operating in the guardian mode, in accordance with some embodiments of the disclosure.

FIG. 8 depicts an illustrative flow diagram of process 800 for providing event notifications while an autonomous vehicle is operating in a guardian mode in accordance with an embodiment of the disclosure. In some embodiments, process 800 may be executed by processing circuitry of an autonomous vehicle 100 (FIGS. 1A-B), 202 (FIG. 2), or 300 (FIG. 3). In some embodiments, the processing circuitry may be one of circuitry 156 of FIG. 1B or processor 312 of FIG. 3.

In some embodiments, the processing circuitry may perform process 500 by execution of instructions stored in memory (e.g., memory 306 of FIG. 3). In some embodiments, the processing circuitry may be a part of server 208 of FIG. 2, which may control autonomous vehicle 202 via a command transmitted over network 204. In some embodiments, process 800 is performed as part of step 412 of FIG. 4.

Process 800 may begin at either one of steps 802, 804, or 806 where the processing circuitry may make a certain determination, while the vehicle is operating in the guardian mode, that may require a notification. Each one of the steps 802, 804, 806 may be performed individually, optionally, sequentially, or simultaneously.

At 802, the processing circuitry may determine that a seat belt has become disengaged. For example, the determination may be made by the processing circuitry using a dedicated seat belt sensor (e.g., sensor incorporated into seat belt mechanism 162 of FIG. 1B), or by using a picture acquired from a camera (e.g., camera 152 of FIG. 1B). When the processing circuitry makes such a determination, process 800 may proceed to step 808.

At 804, the processing circuitry may determine that a traffic accident has occurred. In some embodiments, the processing circuitry may make this determination using pressure sensors, video sensors, audio sensors, or any combination thereof. For example, the processing circuitry may determine that accelerometers sensors of the autonomous vehicle indicate an acceleration over a pre-defined threshold. In another embodiment, the processing circuitry may determine that an airbag has been deployed. In yet another embodiment, the processing circuitry may use a camera to detect the presence of flames. When the processing circuitry makes such a determination, process 800 may proceed to step 808.

At 804, the processing circuitry may determine that the autonomous vehicle was stopped for longer than a threshold amount of time. In some embodiments, the threshold amount may be pre-set at the factory, or selected by the user. In some embodiments, the threshold stopping time may be exceeded if the autonomous vehicle broke down, if the autonomous vehicle is stuck in extremely heavy traffic, or if the autonomous vehicle experienced an accident. In some embodiments, the threshold may be set at three, four, or five minutes, or at any other time period. When the processing circuitry makes such a determination, process 800 may proceed to step 808.

At 802, the processing circuitry may provide an appropriate notification or notifications to a user (e.g., a parent user). In some embodiments, the notifications may be provided via a network (e.g., network 204). For example, if the seat belt has become disengaged, the processing circuitry may send an SMS message to the parent: "Warning! Your child has disengaged the seat belt." In another example, if an accident has occurred, the processing circuitry may send an SMS message to the parent: "Warning! Your child has been involved in an accident." In another example, if a vehicle has been stopped for more than the threshold amount of time, the processing circuitry may send an SMS message to the parent: "Warning! Your child's vehicle is not moving." In some embodiments, the processing circuitry may also provide a video feed, a snapshot, and/or sound feed from the autonomous vehicle. In some embodiments, the processing circuitry may also provide an appropriate notification to first responders or to any other recipient.

Figure 9:
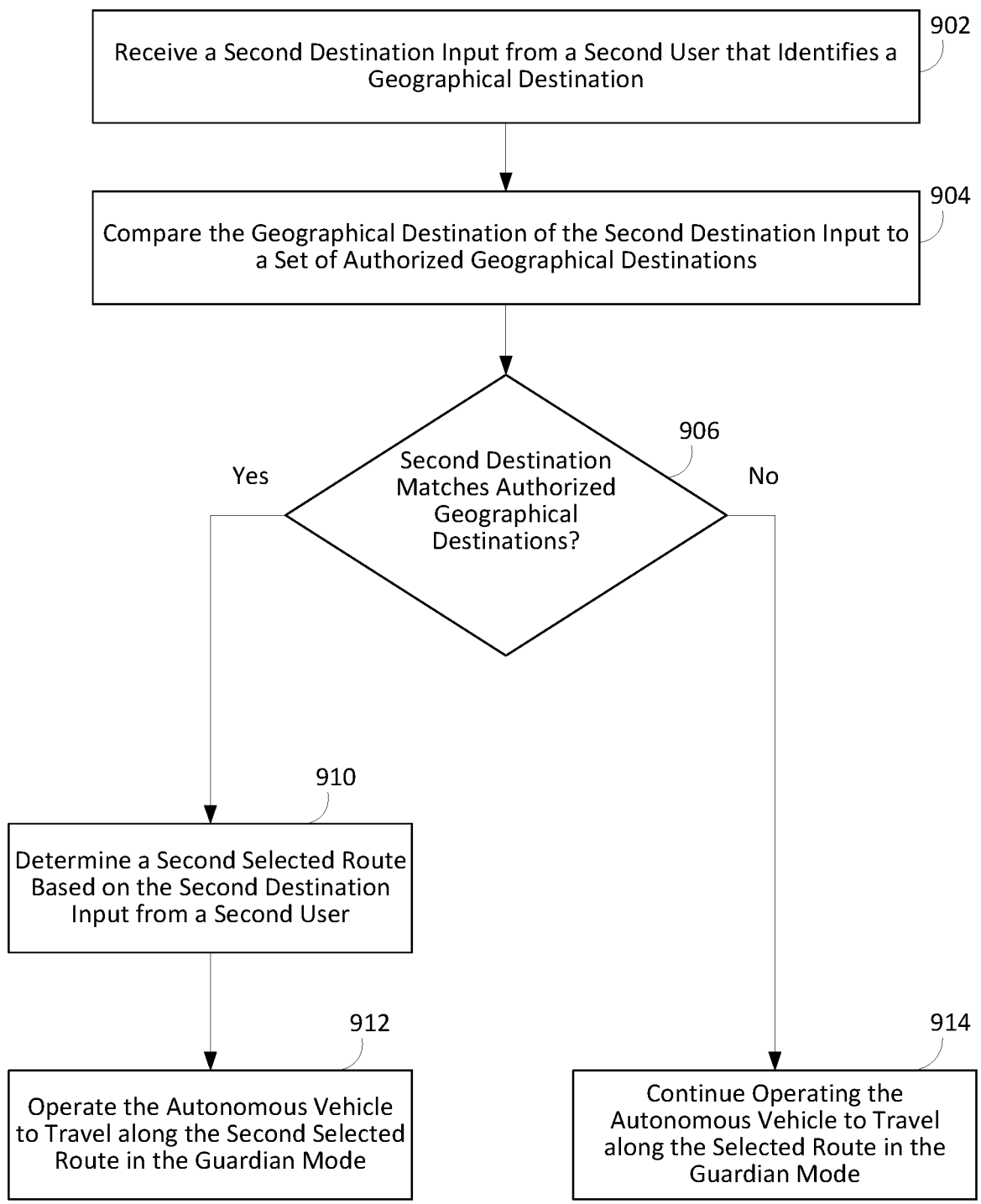
FIG. 9 depicts an illustrative flow diagram of a process for changing a destination while an autonomous vehicle is operating in a guardian mode, in accordance with some embodiments of the disclosure.

FIG. 9 depicts an illustrative flow diagram of a process 900 for changing a destination while an autonomous vehicle is operating in a guardian mode in accordance with an embodiment of the disclosure. In some embodiments, process 900 may be executed by processing circuitry of an autonomous vehicle 100 (FIGS. 1A-B), 202 (FIG. 2), or 300 (FIG. 3). In some embodiments, the processing circuitry may be one of circuitry 156 of FIG. 1B or processor 312 of FIG. 3. In some embodiments, the processing circuitry may perform process 500 by execution of instructions stored in memory (e.g., memory 306 of FIG. 3). In some embodiments, processing circuitry may be a part of server 208 of FIG. 2, which may control autonomous vehicle 202 via a command transmitted over network 204. In some embodiments, process 900 is performed as part of step 412 of FIG. 4.

Process 900 begins at 902, where the processing circuitry may receive a second destination input from a user (e.g. a child user) while the autonomous vehicle is operating in a guardian mode. In some embodiments, the second destination input may identify a second geographical destination that is different from the current geographical destination of the autonomous vehicle. For example, the second destination input may be received from a child currently being transported by the autonomous vehicle. For example, the child may input a new destination via user interface 304 of FIG. 3. For example, instead of going home, the child may request to go a friend's house.

Process 900 continues at 904, where the processing circuitry may compare the geographical destination of the second destination input to a set of authorized geographical destination. For example, the parent user may have previously entered a set of addresses that are pre-approved for that child. For example, the parent may have approved the home address, addresses of several of the child's friends, the school address, and the address of the local library. In some embodiments, the processing circuitry may then check the address of the destination identified by the second destination input against the set of approved addresses.

At 906, the processing circuitry may, in response to determining that the geographical destination of the second destination input matches at least one of the authorized geographical destinations, proceed to step 910. In some embodiments, the processing circuitry may, in response to determining that the geographical destination of the second destination input does not match at least one of the authorized geographical destinations, proceed to step 914.

At step 910, the processing circuitry may determine a second selected route based on the second destination input from a second user. For example, if the child has requested to go to a friend's house, and the friend's house is on the list of approved destinations, the processing circuitry may compute a new route from the current position of the autonomous vehicle to the friend's house.

At step 910, the processing circuitry may operate the autonomous vehicle to travel along the second selected route in the guardian mode. For example, the autonomous vehicle may drive to the child's friend's house.

At 914, the processing circuitry may continue operating the autonomous vehicle to travel along the selected route in the guardian mode. For example, if the child has requested to go to an address that is not authorized, the autonomous vehicle may ignore the second destination input and proceed along the originally selected route (e.g., the route selected in step 406).

It is contemplated that the steps or descriptions of each of FIGS. 4-9 may be used with any other embodiment of this disclosure. It is contemplated that some steps or descriptions of each of FIGS. 4-9 may be optional and may be omitted in some embodiments. In addition, the steps and descriptions described in relation to FIGS. 4-9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIGS. 4-9.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within vehicle 300.

The processes discussed above in FIGS. 4-9 are intended to be illustrative and not limiting. One skilled in the art would appreciate that the steps of the processes in FIGS. 4-9 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for operating an autonomous vehicle, the method comprising:
   receiving a destination input from a user;
   receiving a mode selection input from the user that identifies a driving mode;
   determining a selected route based on the destination input;
   in response to determining that the mode selection input identifies a regular driving mode:
      operating the autonomous vehicle to travel along the selected route in the regular driving mode, wherein at least one capability of a first plurality of capabilities of the autonomous vehicle is enabled and at least one capability of a second plurality of capabilities of the autonomous vehicle is disabled in the regular driving mode; and
   in response to determining that the selection of the mode identifies a guardian mode:
      operating the autonomous vehicle to travel along the selected route in the guardian mode, wherein the at least one capability of the first plurality of capabilities of the autonomous vehicle is disabled and at least one capability of the second plurality of capabilities of the autonomous vehicle is enabled in the guardian mode.

2. The method of claim 1, wherein the first plurality of capabilities of the autonomous vehicle comprises at least two of: window control capability, route selection control capability, music or radio selection control capability, door opening/closing control capability, climate control capability, e-commerce capability, Internet access capability, and seat belt unlocking capability.

3. The method of claim 1, wherein the second plurality of capabilities of the autonomous vehicle comprises at least two of: autonomous vehicle location reporting capability, geofence violation warning capability, password control capability, and camera feed capability.

4. The method of claim 1, further comprising, during the operation of the autonomous vehicle in the guardian mode:
receiving a request to enable a requested capability of the first plurality of capabilities or disable a requested capability of the second plurality of capabilities;
forwarding the request to the user; and
in response to receiving an authorization from the user, enabling the requested capability of the first plurality of capabilities or disabling the requested capability of the second plurality of capabilities.

5. The method of claim 1, further comprising, during the operation of the autonomous vehicle in the guardian mode:
receiving a request to enable a requested capability of the first plurality of capabilities or disable a requested capability of the second plurality of capabilities;
prompting a user to enter a password; and
in response to receiving a correct password from the user, enabling the requested capability of the first plurality of capabilities or disabling the requested capability of the second plurality of capabilities.

6. The method of claim 1, further comprising:
receiving a first user selection, wherein the first user selection identifies which capabilities of the autonomous vehicle are to be disabled in the guardian mode;
receiving a second user selection, wherein the second user selection identifies which capabilities of the autonomous vehicle are be enabled in the guardian mode; and
defining the guardian mode based on the first user selection and the second user selection.

7. The method of claim 1, wherein operating of the autonomous vehicle in the guardian mode comprises:
disabling door opening/closing control capability while the autonomous vehicle travels along the selected route; and
opening a door of the autonomous vehicle when the autonomous vehicle reaches the end of the selected route.

8. The method of claim 1, wherein determining that the selection of the mode identifies the guardian mode comprises determining that the mode selection input comprises a request to transport at least one of: a child user, a senior citizen user, and a mentally handicapped user.

9. The method of claim 1, wherein determining that the selection of the mode identifies the guardian mode comprises determining that the route selection input comprises a geographical location associated with at least one of: a child user, a senior citizen user, and a mentally handicapped user.

10. The method of claim 1, further comprising, when operating the autonomous vehicle to travel along the selected route in guardian mode:
determining that the autonomous vehicle was stopped for longer than a threshold amount of time; and
in response to determining that the autonomous vehicle was stopped for longer than a threshold amount of time, transmitting a stoppage notification to the user.

11. The method of claim 1, further comprising, when operating the autonomous vehicle to travel along the selected route in guardian mode:
determining that a seat belt has been disengaged; and
in response to determining that a seat belt has been disengaged, transmitting a seat belt disengagement notification to the user.

12. The method of claim 1, further comprising, when operating the autonomous vehicle to travel along the selected route in guardian mode:
determining that a vehicle was involved in a traffic accident; and
in response to determining that a vehicle was involved in a traffic accident, transmitting a traffic accident notification to the user.

13. The method of claim 1, further comprising, when operating the autonomous vehicle to travel along the selected route in guardian mode:
receiving a second destination input from that identifies a geographical destination;
comparing the geographical destination of the second destination input to a set of authorized geographical destinations;
in response to determining that the geographical destination of the second destination input matches at least one of the set of authorized geographical destinations:
determining a second selected route based on the second destination input; and
operating the autonomous vehicle to travel along the second selected route in the guardian mode; and
in response to determining that the geographical destination of the second destination input does not match at least one of the set of authorized geographical destinations:
continuing operating the autonomous vehicle to travel along the selected route in the guardian mode.

14. A system for operating an autonomous vehicle, the system comprising:
circuitry configured to:
receive a destination input from a user;
receive a mode selection input from the user that identifies a driving mode;
determine a selected route based on the destination input;
in response to determining that the mode selection input identifies a regular driving mode:
operate the autonomous vehicle to travel along the selected route in the regular driving mode, wherein at least one capability of a first plurality of capabilities of the autonomous vehicle is enabled and at least one capability of a second plurality of capabilities of the autonomous vehicle is disabled in the regular driving mode; and
in response to determining that the selection of the mode identifies a guardian mode:
operate the autonomous vehicle to travel along the selected route in the guardian mode, wherein the at least one capability of the first plurality of capabilities of the autonomous vehicle is disabled and at least one capability of the second plurality of capabilities of the autonomous vehicle is enabled in the guardian mode.

15. The system of claim 14, wherein the circuitry is configured to, during the operation of the autonomous vehicle in the guardian mode:
receive a request to enable a requested capability of the first plurality of capabilities or disable a requested capability of the second plurality of capabilities;
forward the request to the user; and
in response to receiving an authorization from the user, enable the requested capability of the first plurality of capabilities or disable the requested capability of the second plurality of capabilities.

16. The system of claim 14, wherein the circuitry is configured to determine that the selection of the mode identifies the guardian mode by determining that the route selection input comprises a geographical location associated with at least one of: a child user, a senior citizen user, and a mentally handicapped user.

17. The system of claim 14, wherein the circuitry is configured to, when operating the autonomous vehicle to travel along the selected route in guardian mode:
- determine that the autonomous vehicle was stopped for longer than a threshold amount of time; and
- in response to determining that the autonomous vehicle was stopped for longer than a threshold amount of time, transmit a stoppage notification to the user.

18. The system of claim 14, wherein the circuitry is configured to, when operating the autonomous vehicle to travel along the selected route in guardian mode:
- determine that a vehicle was involved in a traffic accident; and
- in response to determining that a vehicle was involved in a traffic accident, transmit a traffic accident notification to the user.

19. A method for operating an autonomous vehicle, the method comprising:
- receiving a destination input from a user;
- receiving a mode selection input from the user that identifies a driving mode;
- determining a selected route based on the destination input;
- in response to determining that the mode selection input identifies a regular driving mode:
  - operating the autonomous vehicle to travel along the selected route in the regular driving mode, wherein at least one capability of a first plurality of capabilities of the autonomous vehicle is enabled in the regular driving mode; and
- in response to determining that the selection of the mode identifies a guardian mode:
  - operating the autonomous vehicle to travel along the selected route in the guardian mode, wherein the at least one capability of the first plurality of capabilities of the autonomous vehicle is disabled in the guardian mode;
  - determining that a vehicle was involved in a traffic accident; and
  - in response to determining that a vehicle was involved in a traffic accident, transmitting a traffic accident notification to the user.

* * * * *